(12) United States Patent
Ju et al.

(10) Patent No.: US 12,418,457 B2
(45) Date of Patent: Sep. 16, 2025

(54) PROCESSING A SEQUENCE OF DATA ITEMS

(71) Applicant: Telefonaktiebolaget LM Ericsson (PUBL), Stockholm (SE)

(72) Inventors: Yue Ju, Mont-Royal (CA); Alka Isac, Saint Laurent (CA); Yimin Nie, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/695,975

(22) PCT Filed: Oct. 1, 2021

(86) PCT No.: PCT/IB2021/059038
§ 371 (c)(1),
(2) Date: Mar. 27, 2024

(87) PCT Pub. No.: WO2023/052827
PCT Pub. Date: Apr. 6, 2023

(65) Prior Publication Data
US 2025/0126027 A1    Apr. 17, 2025

(51) Int. Cl.
*G06F 15/16* (2006.01)
*H04L 41/16* (2022.01)
*H04W 24/02* (2009.01)

(52) U.S. Cl.
CPC ............. *H04L 41/16* (2013.01); *H04W 24/02* (2013.01)

(58) Field of Classification Search
CPC ....... H04L 41/16; H04W 24/02; G06N 3/045; G06N 3/0442; G06N 3/0499; G06N 3/0455; G06N 3/0464; G06N 3/048
See application file for complete search history.

(56) References Cited

U.S. PATENT DOCUMENTS

| | | |
|---|---|---|
| 2018/0365229 A1 | 12/2018 | Buhrmann et al. |
| 2019/0073580 A1 | 3/2019 | Dzhulgakov et al. |
| 2022/0284191 A1* | 9/2022 | Qiu ................... G06F 40/295 |
| 2022/0292285 A1* | 9/2022 | Panda ................. G06N 3/0442 |
| 2023/0015709 A1* | 1/2023 | Bisht .................. H04L 47/127 |

OTHER PUBLICATIONS

Ze Liu et al. "Swin Transformer: Hierarchical Vision Transformer Using Shifted Windows" Aug. 17, 2021.
Yan Liu et al. "Transformer in Convolution Neural Networks"—Jun. 9, 2021.

(Continued)

*Primary Examiner* — John B Walsh
(74) *Attorney, Agent, or Firm* — Sonoda & Kobayashi Intellectual Property Law; Sarvajit S. Patil

(57) ABSTRACT

There is provided a computer-implemented method for processing a sequence of data items. The data items correspond to one or more features of a telecommunications network. The sequence of data items is segmented into a plurality of segments. For each segment of the plurality of segments, the data items in the segment are analysed using a machine learning model to identify a relationship between the data items in the segment and output a representation of the data items in the segment based on the identified relationship.

21 Claims, 11 Drawing Sheets

(56) References Cited

OTHER PUBLICATIONS

Haiping Wu et al. "CvT: Introducing Convolutions to Vision Transformers"—Mar. 29, 2021.
Mingxing Zhang et al. "Multi-stage Aggregated Transformer Network for Temporal Language Localization in Videos"—2021.
Ashish Vaswani et al. "Attention is All You Need" 31st Conference on Neural Information Processing System (NIPS 2017).
Yun Liu et al. "Vision Transformers with Hierarchical Attention"—Jan. 12, 2024.
Hoatian Yan et al. "ConTNet: Why not use convolution and transformer at the same time?"—May 10, 2021.
PCT Written Opinion of the International Searching Authority issued for International application No. PCT/IB2021/059038.
PCT International Search Report issued for International application No. PCT/IB2021/059038—Jul. 22, 2022.

* cited by examiner

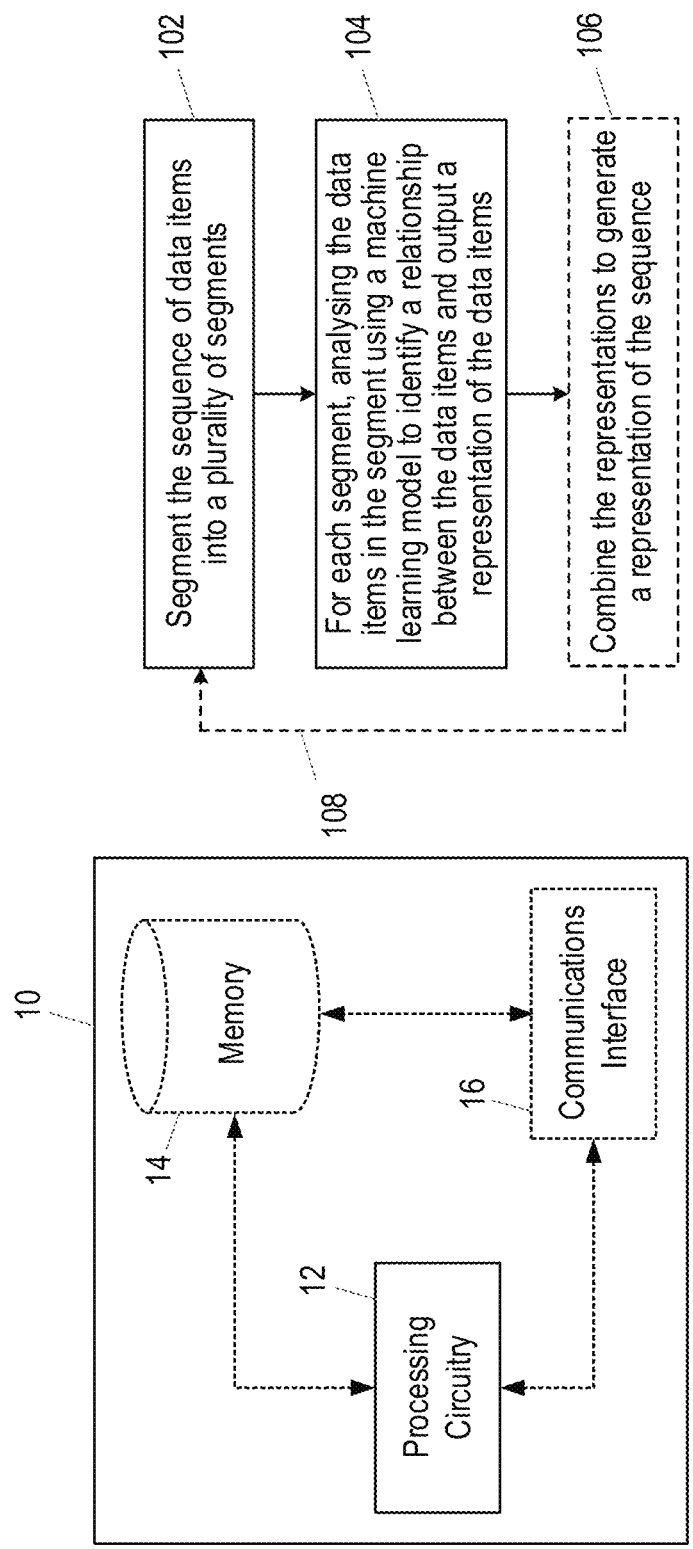

| utcTimeMicroseconds | cellId | bbUeRef | qam256_flag | ri0 | deltaPsd | nrOfCce | wbCqi | nrOfDciBit | isDtx |
|---|---|---|---|---|---|---|---|---|---|
| 0 | 1620093027949758 | 2 | 33784864 | 0 | 1 | 7284.0 | 4.0 | 5 | 46.0 | 1 |
| 1 | 1620093027949791 | 32 | 537110400 | 0 | 1 | 6876.0 | 2.0 | 5 | 54.0 | 0 |

| utcTimeMicroseconds | timestamp |
|---|---|
| CellId | Input feature |
| bbUeRef | User id |
| Qam256_flag | Input feature |
| ri0 | Input feature |
| deltaPsd | Input feature |
| nrOfCce | Input feature |
| WbCqi | Input feature |
| nrOfDciBit | Input feature |
| isDtx | Error rate (Target variable) |

Figure 11

PROCESSING A SEQUENCE OF DATA ITEMS

PRIORITY

This nonprovisional application is a U.S. National Stage Filing under 35 U.S.C. § 371 of International Patent Application Serial No. PCT/IB2021/059038 filed Oct. 1, 2021 and entitled "PROCESSING A SEQUENCE OF DATA ITEMS" which is hereby incorporated by reference in its entirety.

TECHNICAL FIELD

The disclosure relates to a computer-implemented method for processing a sequence of data items and an entity configured to operate in accordance with this method.

BACKGROUND

With an ever increasing demand for a fast and high quality user experience, it is important that a telecommunications network is able to serve large volumes of traffic (e.g. for online sessions) for a large number of end users of the network. In some scenarios, in order to assist with this, a network can be configured to deploy and allocate surrogate servers according to requests received from end users, e.g. via one or more online visit sessions of those end users. A challenge that is associated with providing an optimum user experience is how to, automatically and efficiently, detect events (e.g. a network session failure, a connection failure, a network failure, etc.) in the network that may have an impact on the end user experience. This can be particularly challenging where surrogate servers are deployed, such as in a high speed streaming network, e.g. a video content delivery network (CDN) or other networks providing similar services.

In many scenarios in the field of telecommunications, the prediction of an event (e.g. a failure, an error, or fraud) in a time series of data can play an important role. However, it is difficult to build an efficient and accurate system for detecting an event in these scenarios as the amount of data comprised in the time series of data is generally large and thus the occurrence of certain events can be extremely rare. For example, this can apply in the case of large volumes of streaming data. More specifically, with the ever increasing demand for a fast and high quality user experience, fifth generation (5G) networks can serve large volumes of online sessions for a large number of end users.

There already exist techniques for detecting events in a telecommunications network. In some of these existing techniques, artificial intelligence (AI) and machine learning (ML) is used to analyse data and detect events. These existing techniques often rely on traditional machine learning techniques. The traditional machine learning techniques include regular tree-based techniques or deep neural network models such as a deep recurrent neural network (RNN), e.g. a long-short-term-memory (LSTM) and a gated recurrent unit (GRU). The preferred techniques for analysing a time series of data mostly rely on RNNs as other traditional machine learning models cannot capture the characteristics of sequential behaviour. Even so, although RNNs have shown promising results in learning some contexts from sequential behaviours, they still perform poorly when trained on longer sequences of data that require long-term temporal dependencies to be learnt. In addition, RNNs often result in a slow prediction time. This makes it challenging to apply traditional machine learning models to realistic cases, such as high-speed streaming network operations.

Thus, although techniques already exist for detecting events in a telecommunications network, these existing techniques can be inaccurate and inefficient.

SUMMARY

As mentioned above, existing techniques for detecting events in a telecommunications network can be inaccurate and inefficient. One of the reasons for this is that the existing techniques are not suited to analysing long sequences of data items.

It is an object of the disclosure to obviate or eliminate at least some of the above-described disadvantages associated with existing techniques. Therefore, the disclosure is directed to an improved technique for processing a sequence of data items.

According to an aspect of the disclosure, there is provided a computer-implemented method for processing a sequence of data items. The data items correspond to one or more features of a telecommunications network. The method comprises segmenting the sequence of data items into a plurality of segments. The method also comprises, for each segment of the plurality of segments, analysing the data items in the segment using a machine learning model to identify a relationship between the data items in the segment and output a representation of the data items in the segment based on the identified relationship.

According to another aspect of the disclosure, there is provided an entity configured to operate in accordance with the method. In some embodiments, the entity may comprise processing circuitry configured to operate in accordance with the method. In some embodiments, the entity may comprise at least one memory for storing instructions which, when executed by the processing circuitry, cause the entity to operate in accordance with the method.

According to another aspect of the disclosure, there is provided a computer program comprising instructions which, when executed by processing circuitry, cause the processing circuitry to perform the method.

According to another aspect of the disclosure, there is provided a computer program product, embodied on a non-transitory machine-readable medium, comprising instructions which are executable by processing circuitry to cause the processing circuitry to perform the method.

Therefore, there is provided an advantageous technique for processing a sequence of data items. Specifically, by segmenting the sequence of data items into a plurality of segments and analysing each of those segments in the manner described above, local information between the data items can be captured. Moreover, this local information can be captured irrespective of the length of the sequence of data items, e.g. even in the case of a long sequence of data items. As the representation of the data items in the segment that is output from the analysis is based on the identified relationship between the data items in the segment, such local information is captured in the representation.

The representation of the data items is therefore a convenient and useful source of additional information in a form that can be easily analysed. The representation of the data items can be advantageously analysed for a variety of scenarios and one of these is in the detection of events in a telecommunications network. In particular, the nature of the representation of the data items means that events in a telecommunications network can be detected more accurately and efficiently by analysing the representation of the data items instead of, and/or in addition to, the original sequence of data items. Although the representation of data items provided by way of the technique described herein can be useful in this scenario, it will be understood that there are also many other scenarios in which such a representation of data items can be beneficial.

BRIEF DESCRIPTION OF THE DRAWINGS

For a better understanding of the techniques, and to show how they may be put into effect, reference will now be made, by way of example, to the accompanying drawings, in which:

FIG. 1 is a block diagram illustrating an entity according to an embodiment;

FIG. 2 is a flowchart illustrating a method performed by the entity according to an embodiment;

FIG. 11 is an example of a test dataset; and

DETAILED DESCRIPTION

Figure 3:
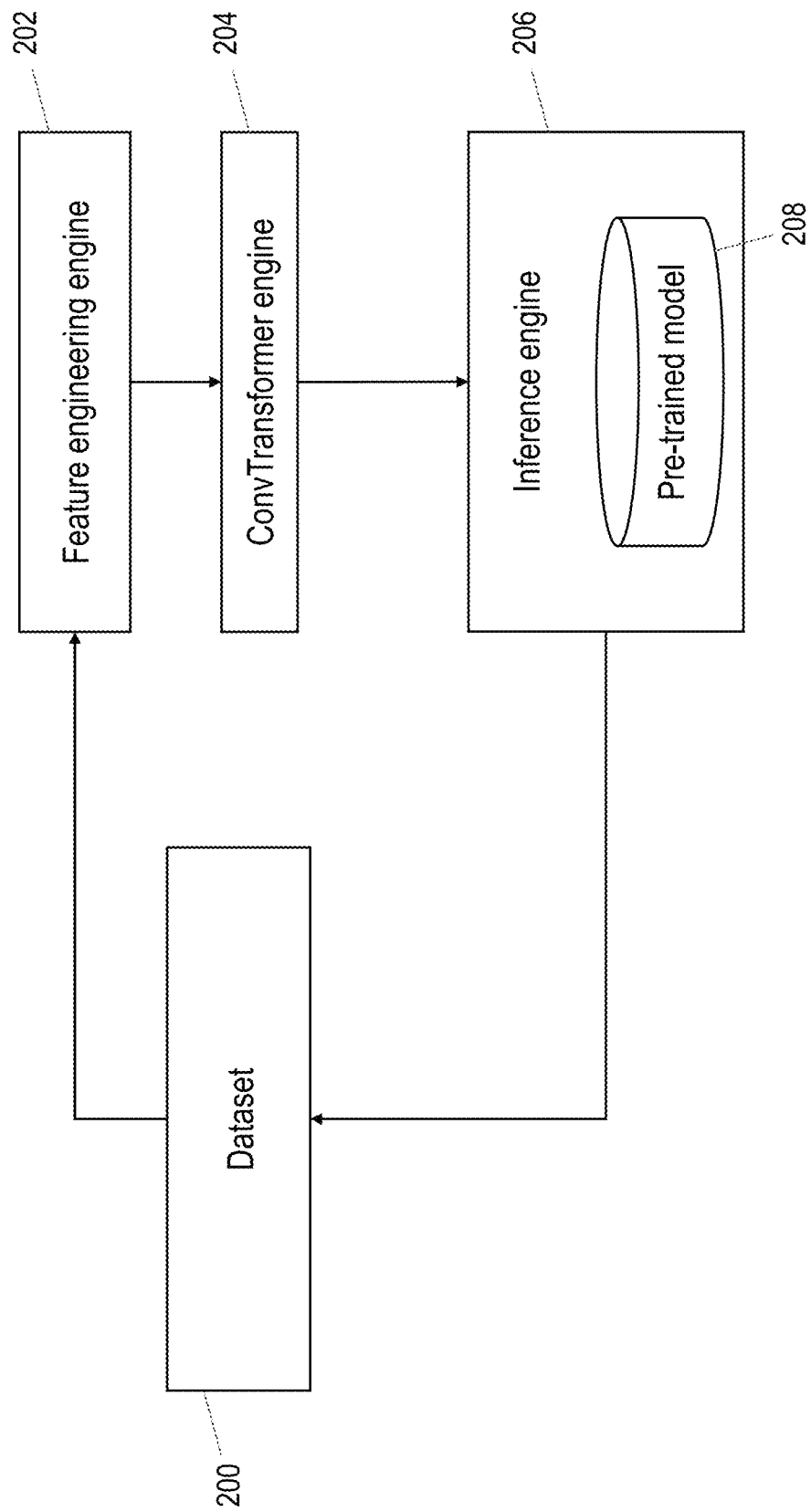
FIG. 3 is a schematic illustration of a system according to an embodiment.

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned earlier, there is described herein an advantageous technique for processing a sequence of data items. These data items referred to herein correspond to one or more features of a telecommunications network. The telecommunications network referred to herein can be any type of telecommunications network. For example, the telecommunications network referred to herein can be a mobile network, such as a fourth generation (4G) mobile network, a fifth generation (5G) mobile network, a sixth generation (6G) mobile network, or any other generation mobile network. In some embodiments, the telecommunications network referred to herein can be a radio access network (RAN). In some embodiments, the telecommunications network referred to herein can be a local network, such as a local area network (LAN). In some embodiments, the telecommunications network referred to herein may be a content delivery network (CDN). Although some examples have been provided for the type of telecommunications network, it will be understood that the telecommunications network can be or any other type of telecommunications network. In some embodiments, the telecommunications network referred to herein can be an edge cloud infrastructure. In some embodiments, the telecommunications network referred to herein can be a virtual network or an at least partially virtual network.

In some embodiments, the technique described herein can be performed by an entity. The technique described herein can be implemented in the cloud according to some embodiments. The techniques described herein are computer-implemented.

FIG. 1 illustrates an entity 10 in accordance with an embodiment. The entity 10 is for processing a sequence of data items. The data items correspond to one or more features of a telecommunications network. The entity 10 referred to herein can refer to equipment capable, configured, arranged and/or operable to communicate directly or indirectly with other entities or equipment to enable and/or to perform the functionality described herein. The entity 10 referred to herein may be a physical entity (e.g. a physical machine) or a virtual entity (e.g. a virtual machine, VM).

As illustrated in FIG. 1, the entity 10 comprises processing circuitry (or logic) 12. The processing circuitry 12 controls the operation of the entity 10 and can implement the method described herein in respect of the entity 10. The processing circuitry 12 can be configured or programmed to control the entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the entity 10. In some embodiments, the processing circuitry 12 can be configured to run software to perform the method described herein in respect of the entity 10. The software may be containerised according to some embodiments. Thus, in some embodiments, the processing circuitry 12 may be configured to run a container to perform the method described herein in respect of the entity 10.

Briefly, the processing circuitry 12 of the entity 10 is configured to segment the sequence of data items into a plurality of segments. The processing circuitry 12 of the entity 10 is also configured to, for each segment of the plurality of segments, analyse the data items in the segment using a machine learning model to identify a relationship between the data items in the segment and output a representation of the data items in the segment based on the identified relationship.

As illustrated in FIG. 1, in some embodiments, the entity 10 may optionally comprise a memory 14. The memory 14 of the entity 10 can comprise a volatile memory or a non-volatile memory. In some embodiments, the memory 14 of the entity 10 may comprise a non-transitory media. Examples of the memory 14 of the entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the entity 10 can be connected to the memory 14 of the entity 10. In some embodiments, the memory 14 of the entity 10 may be for storing program code or instructions which, when executed by the processing circuitry 12 of the entity 10, cause the entity 10 to operate in the manner described herein in respect of the entity 10. For example, in some embodiments, the memory 14 of the entity 10 may be configured to store program code or instructions that can be executed by the processing circuitry 12 of the entity 10 to cause the entity 10 to operate in accordance with the method described herein in respect of the entity 10. Alternatively or in addition, the memory 14 of the entity 10 can be configured to store any information, data, messages, requests, responses, indications, notifications, signals, or similar, that are described herein. The processing circuitry 12 of the entity 10 may be configured to control the memory 14 of the entity 10 to store information, data, messages, requests, responses, indications, notifications, signals, or similar, that are described herein.

In some embodiments, as illustrated in FIG. 1, the entity 10 may optionally comprise a communications interface 16. The communications interface 16 of the entity 10 can be connected to the processing circuitry 12 of the entity 10 and/or the memory 14 of entity 10. The communications interface 16 of the entity 10 may be operable to allow the processing circuitry 12 of the entity 10 to communicate with the memory 14 of the entity 10 and/or vice versa. Similarly, the communications interface 16 of the entity 10 may be operable to allow the processing circuitry 12 of the entity 10 to communicate with any other entities referred to herein. The communications interface 16 of the entity 10 can be configured to transmit and/or receive information, data, messages, requests, responses, indications, notifications, signals, or similar, that are described herein. In some embodiments, the processing circuitry 12 of the entity 10 may be configured to control the communications interface 16 of the entity 10 to transmit and/or receive information, data, messages, requests, responses, indications, notifications, signals, or similar, that are described herein.

Although the entity 10 is illustrated in FIG. 1 as comprising a single memory 14, it will be appreciated that the entity 10 may comprise at least one memory (i.e. a single memory or a plurality of memories) 14 that operate in the manner described herein. Similarly, although the entity 10 is illustrated in FIG. 1 as comprising a single communications interface 16, it will be appreciated that the entity 10 may comprise at least one communications interface (i.e. a single communications interface or a plurality of communications interface) 16 that operate in the manner described herein. It will also be appreciated that FIG. 1 only shows the components required to illustrate an embodiment of the entity 10 and, in practical implementations, the entity 10 may comprise additional or alternative components to those shown.

FIG. 2 illustrates a method performed by the entity 10 in accordance with an embodiment. The method is computer-implemented. The method is for processing a sequence of data items. The data items correspond to one or more features of a telecommunications network. The entity 10 described earlier with reference to FIG. 1 can be configured to operate in accordance with the method of FIG. 2. The method can be performed by or under the control of the processing circuitry 12 of the entity 10 according to some embodiments.

With reference to FIG. 2, as illustrated at block 102, the sequence of data items is segmented (or split) into a plurality of segments (or chunks). As illustrated at block 104 of FIG. 2, for each segment of the plurality of segments, the data items in the segment are analysed using a machine learning model to identify a relationship between the data items in the segment and output a representation of the data items in the segment based on the identified relationship. The machine learning model is trained (e.g. pre-trained) to identify relationships between the data items and output a representation of such data items based on the identified relationship.

The data items referred to herein correspond to one or more features of the telecommunications network. More specifically, each data item corresponds to a feature of the one or more features of the telecommunications network. Herein, a feature can also be referred to as a variable. A feature of the telecommunications network can be converted into a data item for use in the method described herein. A data item is a single unit of data.

The method described herein is for processing a sequence of data items corresponding to one or more features of the telecommunications network. Thus, the sequence referred to herein comprises a plurality of data items (i.e. a plurality of units of data). The data items are ordered to form the sequence of data items. For example, the data items may be ordered according to time (e.g. according to a time stamp assigned to each data item) or any other property of the data items.

In the method described herein, the sequence of data items is segmented (or divided) into a plurality of segments. Thus, the segment referred to herein is part (or a region) of the sequence. Each segment comprises a plurality of data items (i.e. a plurality of units of data) from the sequence of data items. As the data items are ordered in the sequence of data items, each segment comprises an ordered plurality of data items from the sequence of data items. In some embodiments, each segment of the plurality of segments may comprise the same number of data items as each other segment of the plurality of segments.

In the method described herein, for each segment of the plurality of segments, the data items in the segment are analysed using a machine learning model. Thus, a plurality of segments can each be analysed by a machine learning model. In some embodiments, the plurality of segments may each be analysed by the same machine learning model. In other embodiments, at least one of the plurality of segments may be analysed by a different machine learning model to the other ones of the plurality of segments, or each of the plurality of segments may be analysed by a different machine learning model. The plurality of segments are different from one another in that they each comprise different data items from the sequence of data items.

In some embodiments, the relationship between data items can be a (e.g. high level) correlation between the data items. In some embodiments, the relationship between the data items that is referred to herein may be a similarity measure (e.g. a similarity score), an alignment (or attention) score, or any other measure (or score). A similarity measure (e.g. similarity score) can quantify a similarity between the data items (e.g. between any two data items). An alignment (or attention) score can quantify how much attention is to be given to each of the data items. A person skilled in the art will be aware of various techniques that can be used to determine a similarity measure (e.g. similarity score) and various techniques that can be used to determine an alignment (or attention) score.

In an example, the sequence of data items may comprise the data items in the form of sequential vectors and thus the segments into which the sequence is segmented may each comprise data items in the form of sequential vectors, e.g. $x=[x_1, x_2, \ldots x_n]$. Each data item x can represent an embedded vector with a dimension, such as a dimension of emb_dim $x_i \in \mathbb{R}^{emb\_dim}$, which can be encoded from the raw data items. In some embodiments, the relationship between any two data items $x_i$ and $x_j$ can be calculated by an attention mechanism. For example, the relationship ("Attention") between any two data items $x_i$ and $x_j$ may be calculated as follows:

$$\text{Attention}(x_i, x_j) = \Sigma_k \text{correlation}(x_i, x_k) x_j,$$

where the subscript k denotes the index of each data item in the segment, except the data item $x_j$. The correlation in the above equation may be defined by a scaled dot-product, for example, using a softmax function (or normalized exponential function) as follows:

$$\text{Correlation}(x_i, x_k) = \text{softmax}\left(\frac{x_i^T x_k}{\sqrt{d}}\right),$$

where d is the number of units in a layer (namely, the attention layer) that performs the calculation. The scaled dot-product can ensure that the correlation measure (e.g. similarity score) will not be saturated due to a sigmoid-like calculation. In some embodiments, the correlation measure can be a similarity measure (e.g. a similarly score) or any other measure of correlation.

Returning back to FIG. 2, as illustrated at block 106, in some embodiments, the representations output for the plurality of segments may be combined to generate a representation of the sequence. In some embodiments, the number of representations of data items in the generated representation of the sequence may correspond to the number of data items in the sequence. Thus, the length of the sequence may be kept from throughout the process, which prevents the loss of sequential information. In some embodiments, the representations of data items in the representation of the sequence may be in a corresponding order to an order of the data items in the sequence.

As illustrated at arrow 108 of FIG. 2, in some embodiments, the method 102, 104, 106 may be repeated for at least an initial iteration to generate a different representation of the sequence for each iteration. In these embodiments, the representation of the sequence generated from one iteration may be the sequence that is segmented in the subsequent iteration. In some embodiments, in the initial iteration, the representation of the sequence may be segmented differently from the sequence. Alternatively or in addition, in some embodiments, in at least one subsequent iteration, the representation of the sequence may be segmented differently from the representation of the sequence in any one or more preceding iterations. In some embodiments, the number of representations of data items in the generated representation of the sequence for each iteration may correspond to the number of data items in the sequence.

In some embodiments, in the initial iteration, the plurality of segments into which the representation of the sequence is segmented may each comprise representations of a different number of data items than the number of data items in each of the plurality of segments into which the sequence is segmented. Alternatively or in addition, in some embodiments, in the at least one subsequent iteration, the plurality of segments into which the representation of the sequence is segmented may each comprise representations of a different number of data items than the number of data items in each of the plurality of segments into which the representation of the sequence is segmented in any one or more preceding iterations. In some embodiments, the different number of data items referred to herein may be a larger number of data items. Thus, there may be an increase in the number of items per segment in each iteration. In this way, it is possible for the technique described herein to handle both long-term dependencies and dependencies in shorter sections of the sequence of data items, thereby advantageously improving its overall ability to capture dependencies across the sequence of data items.

In some embodiments, the sequence of data items referred to herein may be ordered according to time. In some embodiments, each feature of the one or more features may have a time stamp for use in ordering the corresponding data items into the sequence according to time. In some embodiments, the sequence of data items may be in the form of a vector. In some embodiments, the data items may be acquired from at least one network node (e.g. server, base station, and/or data centre) of the telecommunications network. In some embodiments, the data items may correspond to a user equipment (UE) served by the telecommunications network. In some of these embodiments, an identifier that identifies the UE (or a location of the UE) may be assigned to the sequence of data items. For example, the identifier may comprise information indicative of a geolocation of the UE. Alternatively or in addition, the identifier may be an IP address associated with the UE. In some embodiments, the data items may comprise information indicative of a quality of a connection between a UE and the telecommunications network. In some of these embodiments, the connection between the UE and the telecommunications network may be a connection between the UE and at least one network node (e.g. server, base station, and/or data centre) of the telecommunications network.

In some embodiments, the machine learning model referred to herein may be trained to identify the relationship between data items using a multi-head attention, such as a multi-head attention mechanism with eight layers or any other number of layers. In some embodiments, the machine learning model referred to herein may be a machine learning model that is suitable for natural language processing (NLP) and/or the machine learning model referred to herein may be a deep learning model. In some embodiments, this deep learning model may be a transformer (or a transformer model).

In some embodiments, each feature of the one or more features referred to herein may be encoded or discretized to acquire the corresponding data item. For example, each feature of the one or more features that is a numerical feature may be discretized to acquire the corresponding data item. Alternatively or in addition, for example, each feature of the one or more features that is a categorical feature may be encoded to acquire the corresponding data item. Herein, a categorical feature is a qualitative feature, whereas a numerical feature is a quantitative feature. For example, a categorical feature can be a name or label, and/or a numerical feature can be a number.

The technique described herein can thus be generalised for any (e.g. time series) sequence of data items. In more detail, a traditional transformer model can be used to capture long-term dependencies with ease. A traditional transformer model is typically used in NLP, whereby input sentences are tokenized. The input sequences can be converted to standard numerical data representations in the form of tokens. The tokens can be discretized to make them a suitable input to the traditional transformer model. However, data in the telecommunications domain can contain both categorical and continuous variables. Thus, the technique described herein can be generalised for any type of input by way of encoding or discretizing each feature of the telecommunications network to acquire the corresponding data item, as described earlier.

In some embodiments, the one or more features of the telecommunications network may comprise one or more features of at least one network node (e.g. server, base station, and/or data centre) of the telecommunications network. In some of these embodiments, the at least one network node may comprise at least one network node that is configured to replicate one or more resources of at least one other network node. For example, the at least one network node may be a surrogate server of a content delivery network (CDN). Generally, a CDN may comprise one or more surrogate servers that replicate content from a central (or an origin) server. The surrogate servers can be placed in strategic locations to enable an efficient delivery of content to users of the CDN.

In some embodiments, the one or more features of the telecommunications network may comprise one or more features of a session that a user (or UE) has with the telecommunications network. Some examples of the one or more features of the telecommunications network can include, but are not limited to, an internet protocol (IP) address, a server identifier (ID), an account offering gate, a hypertext transfer protocol (HTTP) request, an indication of a session failure, and/or any other feature of the telecommunications network.

Although not illustrated in FIG. 2, in some embodiments, the representation of the sequence may be analysed using a machine learning model to predict a probability of an event occurring in the telecommunications network, or a rate at which that event will occur in the telecommunications network. More specifically, according to some embodiments, the entity 10 (e.g. processing circuitry 12 of the entity 10) can be configured to perform this analysis to predict the probability or rate. The machine learning model is trained (e.g. pre-trained) to predict such a probability or rate.

In some embodiments, if the predicted probability or rate is above a predefined threshold, an action may be initiated in the telecommunications network to prevent or minimise an impact of the event. More specifically, according to some embodiments, the entity 10 (e.g. processing circuitry 12 of the entity 10) can be configured to initiate this action. In some embodiments, the action may be an adjustment to at least one network node (e.g. server, base station, and/or data centre) of the telecommunications network. In some embodiments, the event referred to herein can be a failure of a communication session in the telecommunications network, a failure of a network node (e.g. server, base station, and/or data centre) of the telecommunications network, an anomaly in a behaviour of the telecommunications network, an incorrect assignment of a control channel in the telecommunications network, and/or any other event in the telecommunications network.

FIG. 3 illustrates a system according to an embodiment. The system illustrated in FIG. 3 comprises a feature engineering engine 202, a transformer engine (which may also be referred to as a convolution transformer engine or "ConvTransformer" engine) 204, and an inference engine 206. Although the feature engineering engine 202, transformer engine 204, and inference engine 206 are shown as separate modules in the embodiment illustrated in FIG. 3, it will be understood that any two or more (or all) of these modules can be comprised in the same entity according to other embodiments. In the embodiment illustrated in FIG. 3, the inference engine 206 comprises a memory 208 that is configured to store a pre-trained machine learning model. Although not illustrated in FIG. 3, in some embodiments, the entity 10 (or the processing circuitry 12 of the entity 10) described herein may comprise one or more of the feature engineering engine 202, transformer engine 204, and inference engine 206. Thus, the steps described with reference to any one or more of these modules 202, 204, 206 can also be said to be performed by the entity 10 (e.g. the processing circuitry 12 of the entity 10).

The feature engineering engine 202 can process an input dataset (e.g. a time series dataset) 200 comprising one or more features of a telecommunications network. In some embodiments, the feature engineering engine 202 can be configured to encode and/or discretize each feature of the one or more features of the telecommunications network to acquire the corresponding data item, as described earlier. For example, the feature engineering engine 202 may be configured to encode both categorical and continuous input feature(s) to fit into the transformer framework. This unique pipeline is not a pipeline that is employed in the traditional transformer framework. The output of the feature engineering engine 202 is the sequence of data items referred to herein and this is the input for the transformer engine 204.

The transformer engine 204 can be configured to segment the sequence of data items into a plurality of segments (as described earlier with reference to block 102 of FIG. 2) and, for each segment of the plurality of segments, analyse the data items in the segment using a machine learning model to identify a relationship between the data items in the segment and output a representation of the data items in the segment based on the identified relationship (as described earlier with reference to block 104 of FIG. 2). As mentioned earlier, the machine learning model can be a transformer model according to some embodiments. For example, the transformer engine 204 may employ a multi-stage transformer framework with a convolutional-style operation for the sequence of data items. Thus, the machine learning model can be trained with multi-stage learning according to some embodiments. The transformer engine 204 can be configured to combine the representations output for the plurality of segments to generate a representation of the sequence (as described earlier with reference to block 106 of FIG. 2). The output of the transformer engine 204 is the representation of the sequence referred to herein and this is the input for the inference engine 206.

The inference engine 206 can be configured to analyse the representation of the sequence using a pre-trained machine learning model (e.g. stored in its memory 208) to make a prediction, such as to predict a probability of an event occurring in the telecommunications network (as described earlier). The inference engine 206 provides an efficient inference pipeline that can perform fast predictions for an incoming sequence of data items, e.g. in real time or near real time.

Figure 4:
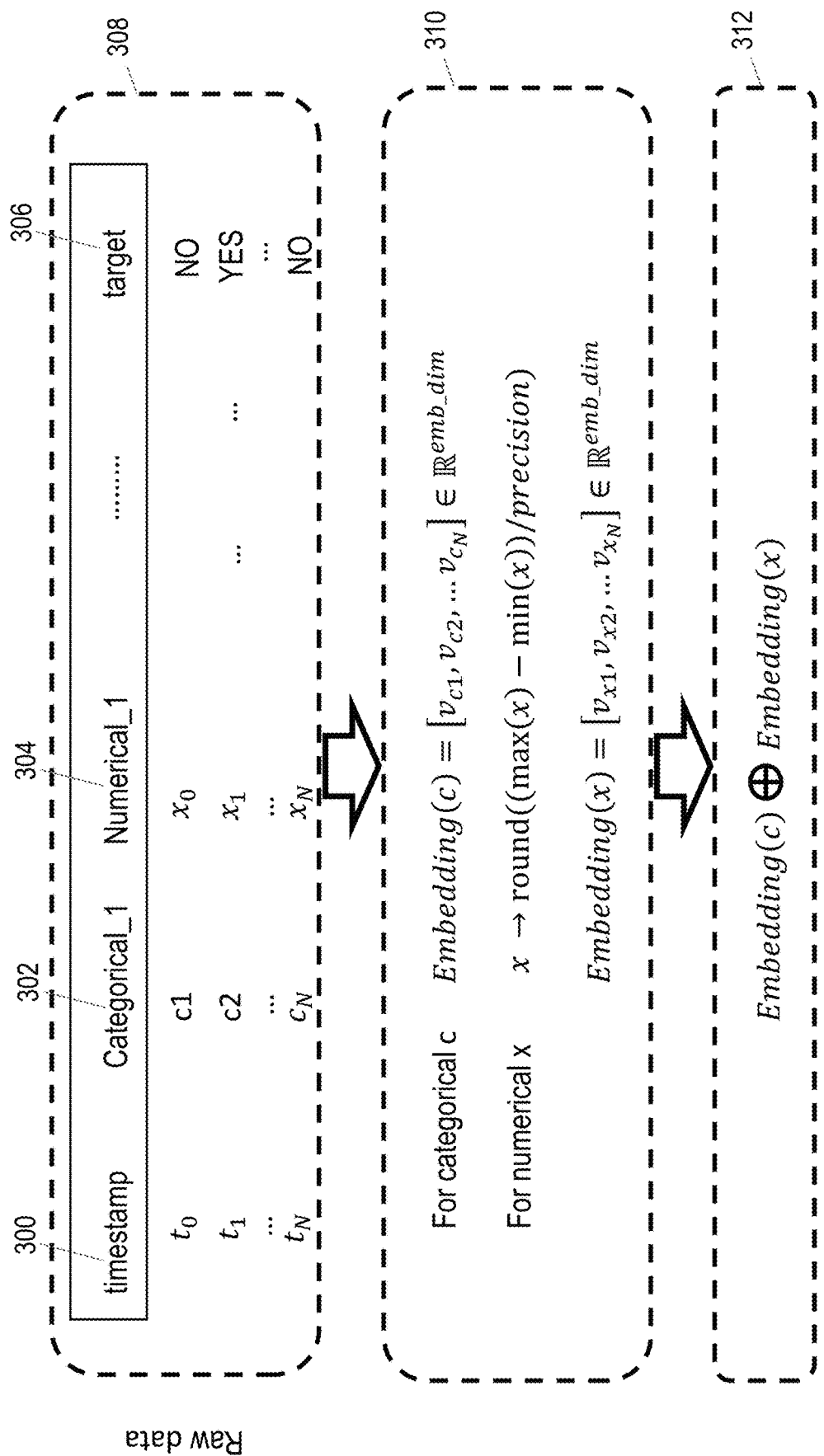
FIG. 4 is a schematic illustration of a method performed according to an embodiment.

FIG. 4 illustrates an example method for pre-processing a plurality of features of a telecommunications network according to an embodiment. The method illustrated in FIG. 4 can be performed by the entity 10 (e.g. the processing circuitry 12, such as the feature engineering engine 202, of the entity 10) described herein.

As illustrated in FIG. 4, the input data (e.g. raw data) 308 comprises the plurality of features 302, 304 of the telecommunications network. The plurality of features 302, 304 of the telecommunications network can comprise a plurality of categorical features 302 $[c_1, c_2, \ldots c_N]$ and/or a plurality of numerical features 304 $[x_0, x_1, \ldots x_N]$. The input data (e.g. raw data) 308 can also comprise one or more target variables 306 [NO, YES, . . . . NO]. As illustrated in FIG. 4, the input data (e.g. raw data) 308 can comprise a plurality of time stamps 300 $[t_0, t_1, \ldots t_N]$. The plurality of features 302, 304 of the telecommunications network are ordered according to their respective time stamps 300.

As illustrated at block 310 of FIG. 4, each feature of the plurality of features 302, 304 of the telecommunications network may be encoded or discretized to acquire the corresponding data item. For example, each feature of the plurality of features that is a categorical feature 302 can be encoded to acquire the corresponding data item. Similarly, for example, each feature of the plurality of features that is a numerical feature 304 can be discretized to acquire the corresponding data item.

The categorical features 302 may be encoded using a regular embedding vector. In this way, the categorical features 302 can be converted into embeddings. The embeddings into which the categorical features 302 are converted can thus be a vector representation of the categorical features 302 according to some embodiments. The numerical features 304 may be discretized by normalization with precision and rounded into quasi-integers. For example, if a maximal value and minimal value of a numerical feature x is 3.752 and 0.012 respectively, the normalized vector can be a series integer [3752, . . . , 12] by precision=0.001. Once the numerical features 304 are converted into integers, they may be further converted into embeddings in the same way as the categorical features 304. For example, the integers into which the numerical features 304 are converted may be encoded using a regular embedding vector. The embeddings into which the numerical features 304 are converted can thus be a vector representation of the numerical features 304 according to some embodiments. The embeddings provide a useful format for input into a transformer model.

As illustrated at block 312 of FIG. 4, the output of the pre-processing method is the embeddings. In this way, the plurality of categorical features 302 can be converted into a sequence of data items corresponding to the plurality of categorical features 302 and the plurality of numerical features 304 can be converted into a sequence of data items corresponding to the plurality of numerical features 304.

Figure 5:
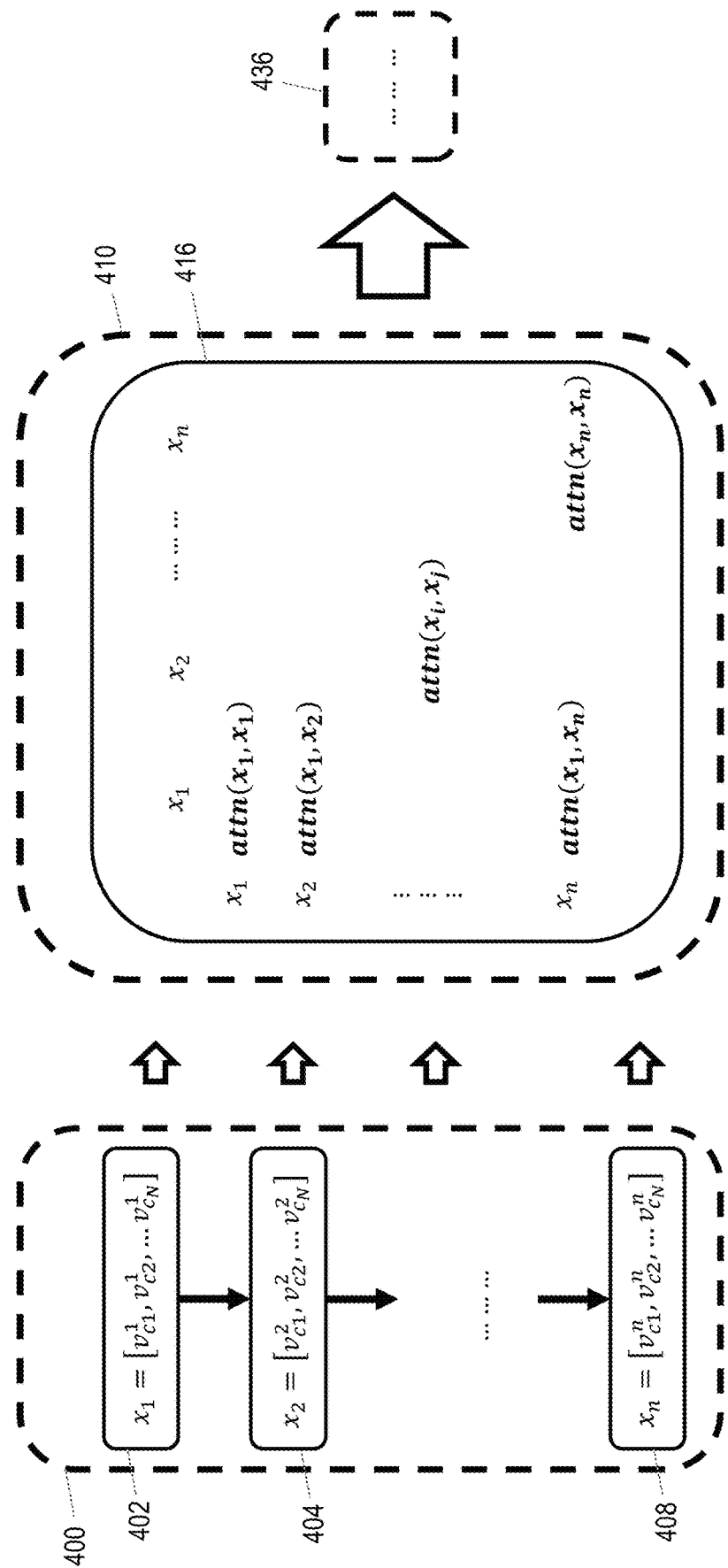
FIG. 5 is a schematic illustration of a method performed according to a traditional technique.

FIG. 5 illustrates an example method for processing a sequence 400 of data items 402, 404, 408 corresponding to a plurality of features of a telecommunications network according to a traditional technique. In the example illustrated in FIG. 5, the input is an encoded sequence 400 of data items 402, 404, 408. The data items 402, 404, 408 are each in the form of a vector in this example. The encoded sequence 400 of data items 402, 404, 408 is input into a traditional transformer model 410. As illustrated at block 416 of FIG. 5, the traditional transformer model 410 calculates an attention score for the encoded input sequence 400 of data items 402, 404, 408. The transformer model advantageously captures global relationships (which, in this example, is the attention score between each pair of data items) across all data items 402, 404, 408 in the sequence 400 and produces a corresponding output 436. In this way, the logical content between two distant data items 402, 408 can be captured.

However, it can also be advantageous to capture certain information within local (e.g. neighbouring) regions of the sequence 400 of data items 402, 404, 408. This can be particularly valuable in the case of a long sequence of data items. It has been realised that (e.g. small) segments of the sequence 400 can correlate more than when considering the entire sequence 400. Moreover, for long sequences, a significant amount of resources may be needed to maintain the attention matrix of the traditional transformer model 410, especially during training of deep layers of the network. Thus, capturing local information within segments of the sequence 400 of data items 402, 404, 408 can reduce the amount of resources required.

Figure 6:
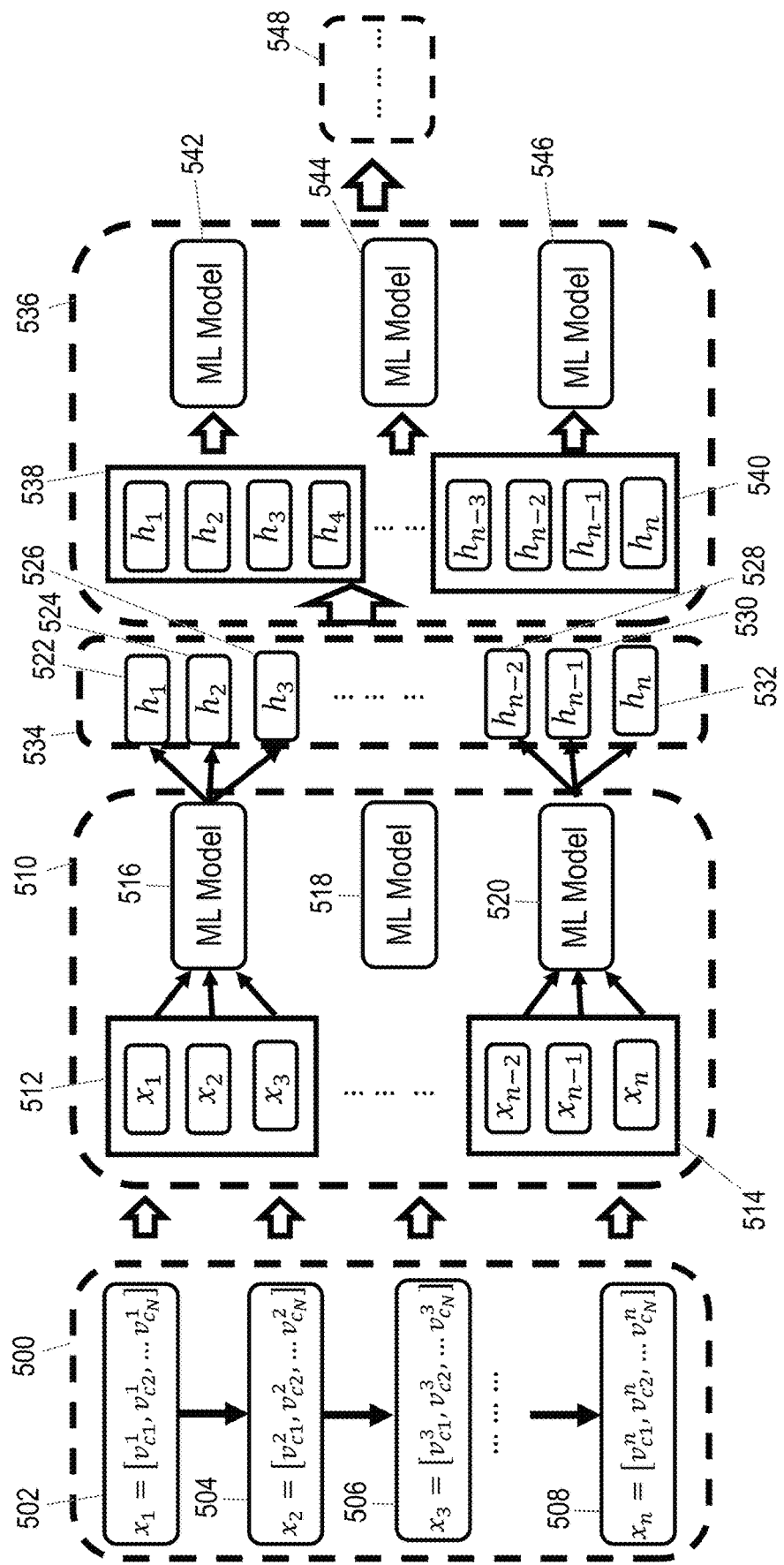
FIG. 6 is a schematic illustration of a machine learning model architecture for performing a method according to an embodiment.

FIG. 6 illustrates an example machine learning model architecture for performing a method for processing a sequence 500 of data items 502, 504, 506, 508 corresponding to one or more features of a telecommunications network. The method can be performed by the entity 10 (e.g. the processing circuitry 12, such as the transformer engine 204, of the entity 10) described herein. The method comprises multiple stages. The multiple stages comprise a first stage, which is illustrated by block 510, and a second stage, which is illustrated by block 536. Although only two stages 510, 536 are illustrated in FIG. 6, it will be understood that the method can comprise any other number of stages (e.g. at least three or more stages).

As illustrated at block 510 of FIG. 6, the sequence 500 of data items 502, 504, 506, 508 is segmented into a plurality of segments 512, 514. As also illustrated at block 510 of FIG. 6, for each segment of the plurality of segments 512, 514, the data items 502, 504, 506, 508 in the segment are analysed using a machine learning model 516, 518, 520 to identify a relationship between the data items 502, 504, 506, 508 in the segment and output a representation 522, 524, 526, 528, 530, 532 of the data items 502, 504, 506, 508 in the segment based on the identified relationship. As illustrated in FIG. 6, the representations 522, 524, 526, 528, 530, 532 output for the plurality of segments 512, 514 are combined to generate a representation 534 of the sequence 500.

This method can be repeated for at least an initial iteration 536 to generate a different representation of the sequence 500. In more detail, the representation 534 of the sequence 500 is segmented into a plurality of segments 538, 540. For each segment of the plurality of segments 538, 540, the representations 522, 524, 526, 528, 530, 532 in the segment 538, 540 are analysed using a machine learning model 542, 544, 546 to identify a relationship between the representations 522, 524, 526, 528, 530, 532 in the segment 538, 540. At block 548, further processing may optionally be performed.

Although only an initial iteration 536 is illustrated in FIG. 6, it will be understood that the method can be repeated for any number of iterations. A different representation of the sequence 500 can be generated for each iteration. The representation of the sequence 500 generated from one iteration is the sequence that is segmented in the subsequent iteration. In the initial iteration 536, the representation 534 of the sequence 500 is segmented differently from the sequence 500. In the initial iteration 536, the plurality of segments 538, 540 into which the representation 534 of the sequence 500 is segmented each comprise representations of a larger number of data items 502, 504, 506, 508 than the number of data items in each of the plurality of segments 512, 514 into which the sequence 500 is segmented.

In a more detail, according to the method illustrated in FIG. 6, the input sequence 500, 534 to each stage 510, 536 is partitioned (or segmented) into different subregions (or segments) 512, 514, 538, 540. Effectively, the different subregions 512, 514, 538, 540 each provide a convolution block. Each stage 510, 536 can have a different kernel size. An attention matrix may be calculated and hidden features 522, 524, 526, 528, 530, 532 can be extracted for each of the different subregions 512, 514, 538, 540. For example, if the kernel size is set to 3 for a first stage 510, an input sequence $x=[x_1, x_2, \ldots, x_n]$ with a vector size of n*emb_dim is partitioned to subregions 512, 514 of size 3, as follows:

$$x = [x_1, x_2, \ldots x_n] \rightarrow [[x_1, x_2, x_3], [x_4, x_5, x_6], \ldots [x_{n-2}, x_{n-1}, x_n]] \text{ for kernel size} = 3.$$

A hidden state can be calculated for each convolutional block as follows:

$$\text{Transformer}([x_1, x_2, x_3]) = [h_1, h_2, h_3], \ldots,$$

$$\text{Transformer}([x_{n-2}, x_{n-1}, x_n]) = [h_{n-2}, h_{n-1}, h_n].$$

A hidden relationship between local regions is extracted by way of this calculation. The output 534 of the first stage 510 is a concatenation of extracted features $[h_1, h_2, \ldots h_{n-1}, h_n]$. The next stage 536 takes this output 534 as its input and partitions the concatenation of extracted features $[h_1, h_2, \ldots h_{n-1}, h_n]$ into a different set of subregions 538, 540 with a larger kernel size (e.g. kernel size=4). Then, the attention mechanism can be applied to the subregions 538, 540 of this new input. In such a way, local information can be extracted together with more global information while moving through the recursive stages 510, 536.

In another example, the machine learning model architecture illustrated in FIG. 6 can be used to extract local and global information from a (e.g. long) sequence of data items. The sequence of data items may be in the form of a vector with n data items, as follows:

$$x = [x_1, x_2, \ldots x_n],$$

where each element $x_i$ is a d-dimensional embedded vector.

Assuming that the machine learning model architecture has multiple stages, in each stage, the entire sequence of data items is segmented into (e.g. small) segments. For example, in a first stage, the sequence of data items may be segmented as follows:

$$[x_1, x_2, x_3], [x_4, x_5, x_6] \ldots.$$

Thus, in this example, each segment for the first stage comprises three data items. A transformer model is used as the machine learning model for the purpose of this example. Thus, the transformer model is applied to each segment. By applying the transformer model to each segment, an extracted vector can be obtained as the representation of the data items in that segment. For example, the extracted vector obtained for the first stage may be as follows:

$$[h_1^{(1)}, h_2^{(1)}, h_3^{(1)}], [h_4^{(1)}, h_5^{(1)}, h_6^{(1)}] \ldots,$$

where the upper index represents the number of the stage.

Before a second stage, there is no need to perform max pooling or average pooling like there is in a traditional convolution neural network (CNN). Instead, the extracted vectors obtained for the first stage may be concatenated together as a whole to obtain the representation of the sequence of data items, as follows:

$$H^{(1)} = [h_1^{(1)}, h_2^{(1)}, h_3^{(1)}, h_4^{(1)}, h_5^{(1)}, h_6^{(1)}, \ldots h_n^{(1)}].$$

Afterward, for the second stage, the representation of the sequence of data items may be segmented into segments. The segments for the second stage can be of a larger size than the segments for the first stage. For example, in the second stage, the representation of the sequence of data items may be segmented as follows:

$$[h_1^{(1)}, h_2^{(1)}, h_3^{(1)}, h_4^{(1)}], [h_5^{(1)}, h_6^{(1)}, h_7^{(1)}, h_8^{(1)}], \ldots.$$

Thus, in this example, each segment for the second stage comprises representations of four data items. In the second stage, the transformer model is applied to each segment and the concatenation mentioned earlier is performed. The representation of the sequence of data items output for the second stage can be a vector, as follows:

$$H^{(2)} = [h_1^{(2)}, h_2^{(2)}, h_3^{(2)}, h_4^{(2)}, h_5^{(2)}, h_6^{(2)}, \ldots h_n^{(2)}].$$

In some embodiments, a third stage calculation may be performed in the same manner as the earlier stages. Any number of stages may be used. The further stages can be performed recursively in the same way. Lastly, a regular feedforward layer may be applied for target variables in the usual way.

As illustrated in the above example, the same length n of the sequence of data items may be maintained from the initial input sequence $x = [x_1, x_2, \ldots x_n]$ for the first stage to the final output $H^{(K)} = [h_1^{(K)}, h_2^{(K)}, h_3^{(K)}, h_4^{(K)}, h_5^{(K)}, h_6^{(K)}, \ldots h_n^{(K)}]$ for the Kth stage. The length of the initial sequence can therefore be preserved through the entire process. As also illustrated in the above example, the operation using multiple stages can gradually group local information to global with incremental segment size (e.g. kernel size) to scan global information while sustaining local information. While regular convolution with pooling (e.g. max pooling or average pooling) changes the size of an input gradually, it does not work for time sequences because it changes the length of the sequence in the end. The method described herein can therefore be useful in such scenarios. In addition to the previously described advantages, the method described herein is also resource efficient. Moreover, the method described herein can be made even more resource efficient by ensuring that multiple smaller non-overlapping machine learning models (e.g. transformer models) are used for the entire transmission from the input sequence x to the representation output at the end stage $H^{(K)}$.

The architecture illustrated in FIG. 6 can perform both the role of a transformer model and a CNN style structure, and the method performed using the architecture can be applied to any length of sequence of data items, even a long length sequence of data items such as long sequential vectors. The method can advantageously combine the global attention logic of a transformer model and the convolutional logic of a CNN. For example, a convolutional operation can relate information with a local segment, while the transformer model can calculate a global attention score. The method may use the convolutional operation in CNNs for a sequence of data items (e.g. sequential vectors), such that the transformer attention matrix can be scaled. This can reduce the overall computational limitations in using a large attention matrix for deep transformer networks.

In embodiments comprising multiple stages, the different stages can mimic the pooling operation in CNNs. The machine learning model can capture information from global and local segments at different stages. The method can employ multiple stages to realise a convolution-style attention based on a basic transformer block, such as the single transformer structure illustrated in FIG. 7.

Figure 7:
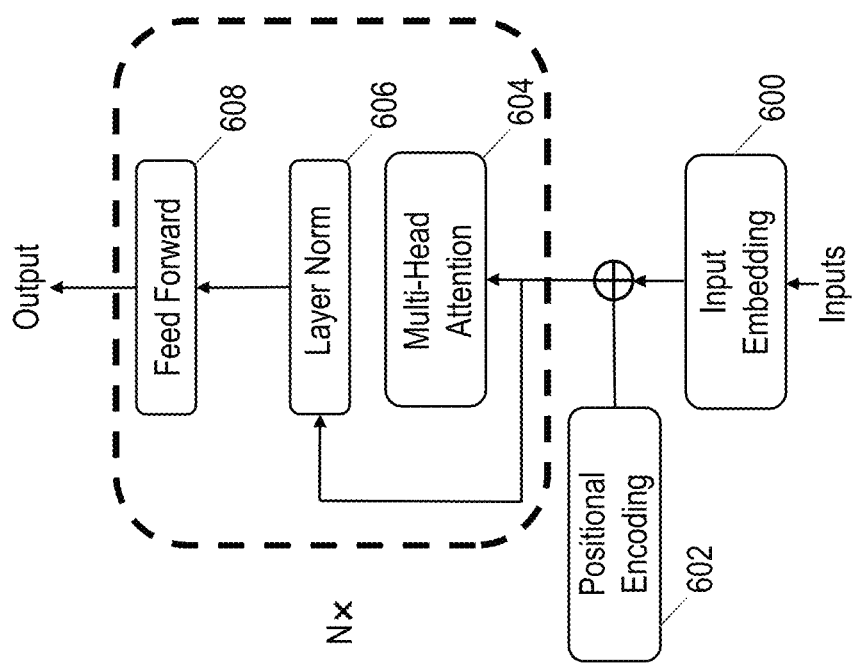
FIGS. 7 to 9 are schematic illustrations of methods performed according to some embodiments.

FIG. 7 illustrates a general structure for a transformer with multi-headed attention according to an embodiment. As illustrated in FIG. 7, the input (e.g. input data) is the sequence of data items.

At block 600 of FIG. 7, the sequence of data items may be embedded. For example, the sequence of data items can be embedded in an embedding layer. At block 602 of FIG. 7, the sequence of data items can be encoded to obtain an encoded sequence of data items. In some embodiments, the sequence of data items may be encoded with information indicative of a position of the data items in the sequence of data items. For example, the relative position of each data item may be encoded by a positional encoding layer. However, any other encoding is also possible.

At block 604 of FIG. 7, the encoded sequence of data items is segmented into a plurality of segments and, for each segment of the plurality of segments, the data items in the segment are analysed using a machine learning model to identify a relationship between the data items in the segment and output a representation of the data items in the segment based on the identified relationship. The machine learning model can be trained to identify the relationship between the data items in the encoded sequence of data items, e.g. using a multi-head attention mechanism. The multi-head attention mechanism can thus be applied to identify a relationship (e.g. a sentimental relationship) between data items in the encoded sequence.

The use of a multi-head attention mechanism can ensure that any bias, e.g. from random seeding in the system, is reduced. Typically, multiple calculations based on a single attention head can be performed with different random seeds, which generate different initial embedding vectors x. For example, multiple outputs can be obtained for different attention matrices, e.g. attention$_1$, attention$_2$, ... attention$_N$ may be obtained based on different random seeds. The random seeds can, for example, be set by a user (e.g. modeller). Following the multiple calculations performed with different random seeds, a multi-head attention vector may be obtained by concatenating the outputs of these calculations, e.g. as follows:

MultiHeadedAtten=[attention$_1$,attention$_2$, ... attention$_N$].

At block 606 of FIG. 7, a layer normalisation is applied. This can, for example, ensure that the output does not drift due to any variation in the data item distribution. At block 608 of FIG. 7, a regular feedforward layer can be applied.

Figure 8:
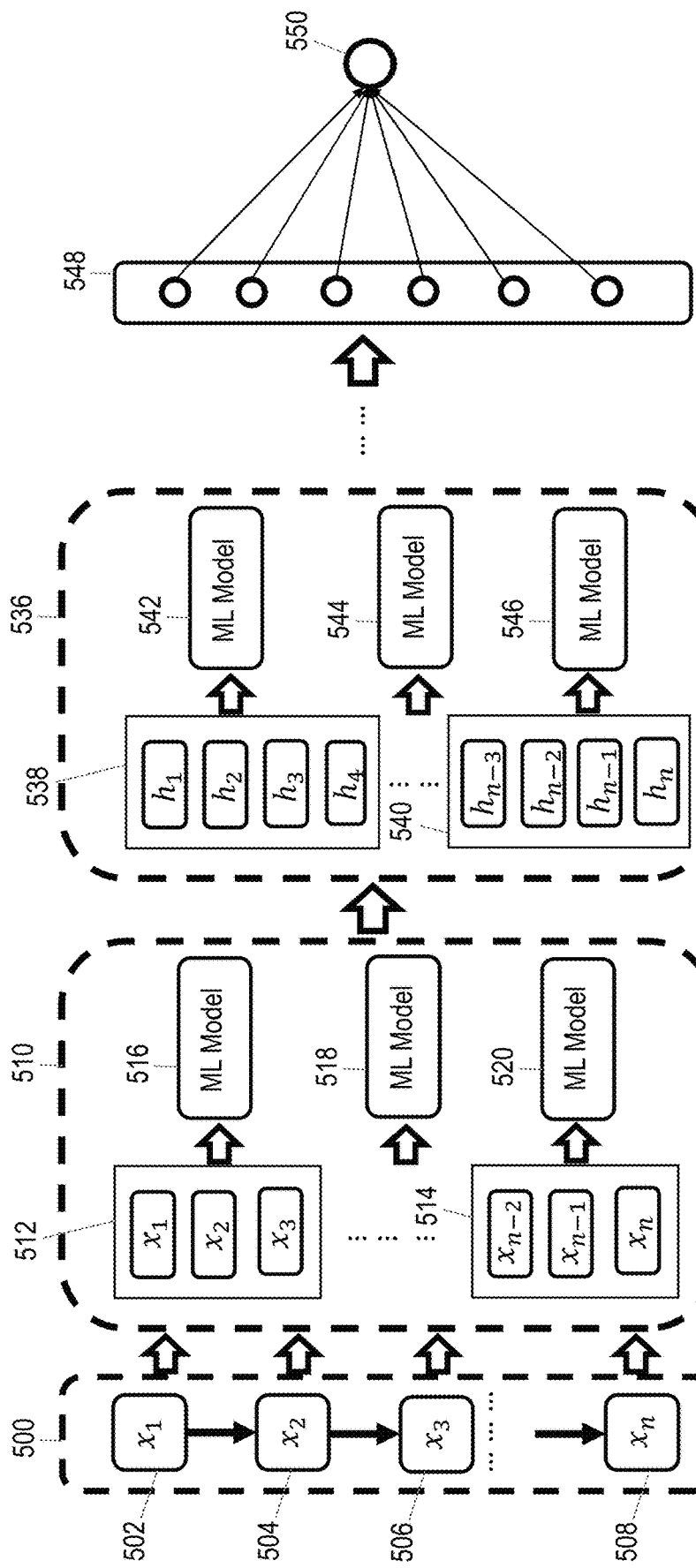

FIG. 8 illustrates an example method for processing a sequence of data items corresponding to one or more features of a telecommunications network according to an embodiment. The sequence 500 of data items and the two stages 510, 536 are as described earlier with reference to FIG. 6. In more detail, FIG. 8 shows the configuration of the multiple training stages that use a transformer model. The model hyperparameters used in training are also included. As illustrated in FIG. 8, in some embodiments, the output of the last stage 536 can be fed into a feedforward layer 548. The feedforward layer may have a predefined dropout rate, e.g. to avoid overfitting. The final output 550 may be a probability, e.g. estimated by a sigmoid activation function. Although not illustrated in FIG. 8, in some embodiments, a (e.g. customizable) block-dropout mechanism may be included at each stage 510, 536. This can reduce computational complexity and overfitting while maintaining similar performance.

In an example, a large sequence of data items corresponding to respective features of a telecommunications network may be encoded into an embedded dimension (e.g. 128 or 256, which can be tuned). For each stage 510, 536 of the method, a maximum (or max) pooling operation may be applied. The maximum pooling operation can be that used in CNNs. An incremental kernel size may be used across the stages 510, 536. A multi-headed (e.g. six or eight head) attention mechanism may be applied at each of the stages 510, 536. The first stage 510 can take the embedded input sequences 500 from the feature engineering engine 202 described earlier and perform a small-region transformer 516, 518, 520 to extract the hidden features of the region. The concatenated extracted features can be sent as input to the next stage 536. The output of the last stage 536 may be fed into the feedforward layer 548, such as with a dropout rate of 0.2 to avoid overfitting. The final output 550 may be a probability, which may be estimated by a sigmoid activation function.

According to the characteristics of a sequence (e.g. time series) of data items, the closer the data items in the sequence are to the target representation of the sequence, the greater the impact those data items have on the target representation. On the contrary, the data items in the sequence that are far away from the target representation of the sequence have relatively little influence on the target representation. Based on this assumption, a certain number of blocks can be discarded from top to bottom at each stage. In more detail, according to the characteristics of a sequence (e.g. time series) of data items, the data items in the sequence (e.g. $[x_1, x_2, \ldots x_{t-1}, x_t]$) can have an impact on the target representation of the sequence (e.g. $y_t$). This impact may depend on decay factors. For example, the most recently acquired data items (e.g. $x_{t-1}$, $x_t$) in the sequence of data items might have more of an impact on the target representation of the sequence (e.g. $y_t$) than less recently acquired data items (e.g. $x_1$, $x_2$). Therefore, a dropout mechanism may be used to (e.g. randomly) drop a predefined (e.g. small) amount of data items, such as those data items that are acquired a predefined (e.g. long) time after a current time t. In this way, it is possible to further reduce the computational complexity, whist still maintaining a similar performance.

Figure 9:
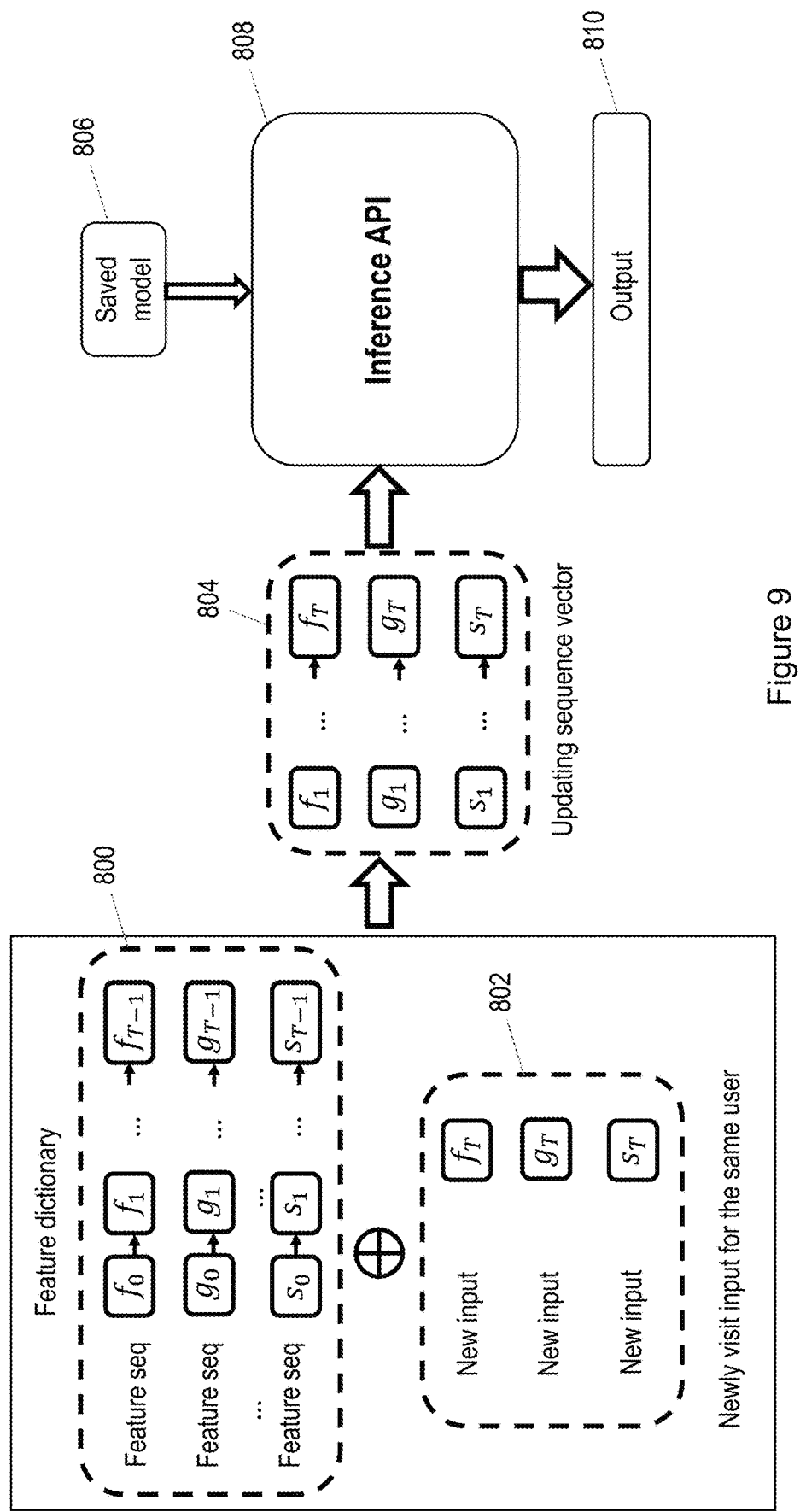

FIG. 9 illustrates an example method for performing inference (or making a prediction) according to an embodiment. The method illustrated in FIG. 9 can be performed by the entity 10 (e.g. the processing circuitry 12, such as the inference engine 206, of the entity 10) described herein. For example, the entity 10 can provide an application programming interface (API) 808 for performing the inference. The API 808 may be used for (e.g. session) inference for predicting a probability of an event occurring in a telecommunications network (e.g. a failure of the telecommunications network). The inference may be performed in real-time, or near real-time.

When new data items (e.g. comprising visit session data) 802 are provided by, or acquired from, the telecommunications network (e.g. a network node, such as a server or base station of the telecommunications network), the data items 802 may be organised into corresponding groups. The API 808 may be responsible for organising the data items 802 into the corresponding groups. In some embodiments, an identifier (e.g. an IP address) may be assigned to the data items 802. The identifier may identify a UE, a user, or a cell to which the data items correspond. In some embodiments, the data items 802 may be organised into the corresponding groups by a key, such as the identifier. The data items 802 correspond to one or more features of the telecommunications network. The data items 802 may be organised into the corresponding groups by, for each feature of the one or more features, organising the corresponding data items into a sequence of data items according to time to obtain at least one sequence 804 of data items. The number of sequences 804 of data items can thus correspond to the number of features. Thus, at least one updated sequence 804 can be formulated.

The input data items 802 may be formulated into the updated sequences 804 taking into account the input data items 802 and optionally also historical (e.g. previously stored) data items 800. The historical data items 800 may be in the form of a dictionary and/or may be specified by the key (e.g. identifier) mentioned earlier. In some embodiments, each sequence of data items may be shifted by a time stamp. For example, for each sequence of data items, the sequence may be recursively transferred from $x_0, x_1, \ldots x_{T-1}$ to $x_1, x_2, \ldots x_T$ to ensure the length of the sequence of data items remains the same for input into a machine learning model. Each sequence of data items is processed in the manner described earlier to acquire the representation of the sequence. That is, multiple calculations may be performed for each sequence of data items, each time using the output of one stage as the input to the next stage in the manner described earlier, and the representations output for the plurality of segments of the sequence can then be combined to generate the representation of the sequence as described earlier.

Afterwards, the previously trained machine learning (e.g. transformer) model 806 may be called from a memory (e.g. the memory 14 of the entity 10) to predict an output 810. More specifically, the entity 10 (e.g. via the API 808) may analyse the representation of the sequence using the pre-trained machine learning model to predict an output 810. The output 810 can be a probability of a target variable. For example, the output 810 may be a probability of an event (e.g. an error or failure, such as a session failure) occurring in the telecommunications network, or a rate at which that event will occur in the telecommunications network.

As mentioned earlier, the telecommunications network in respect of which the techniques described herein can be implemented may be any type of telecommunications network and one example is a mobile network.

Figure 10:
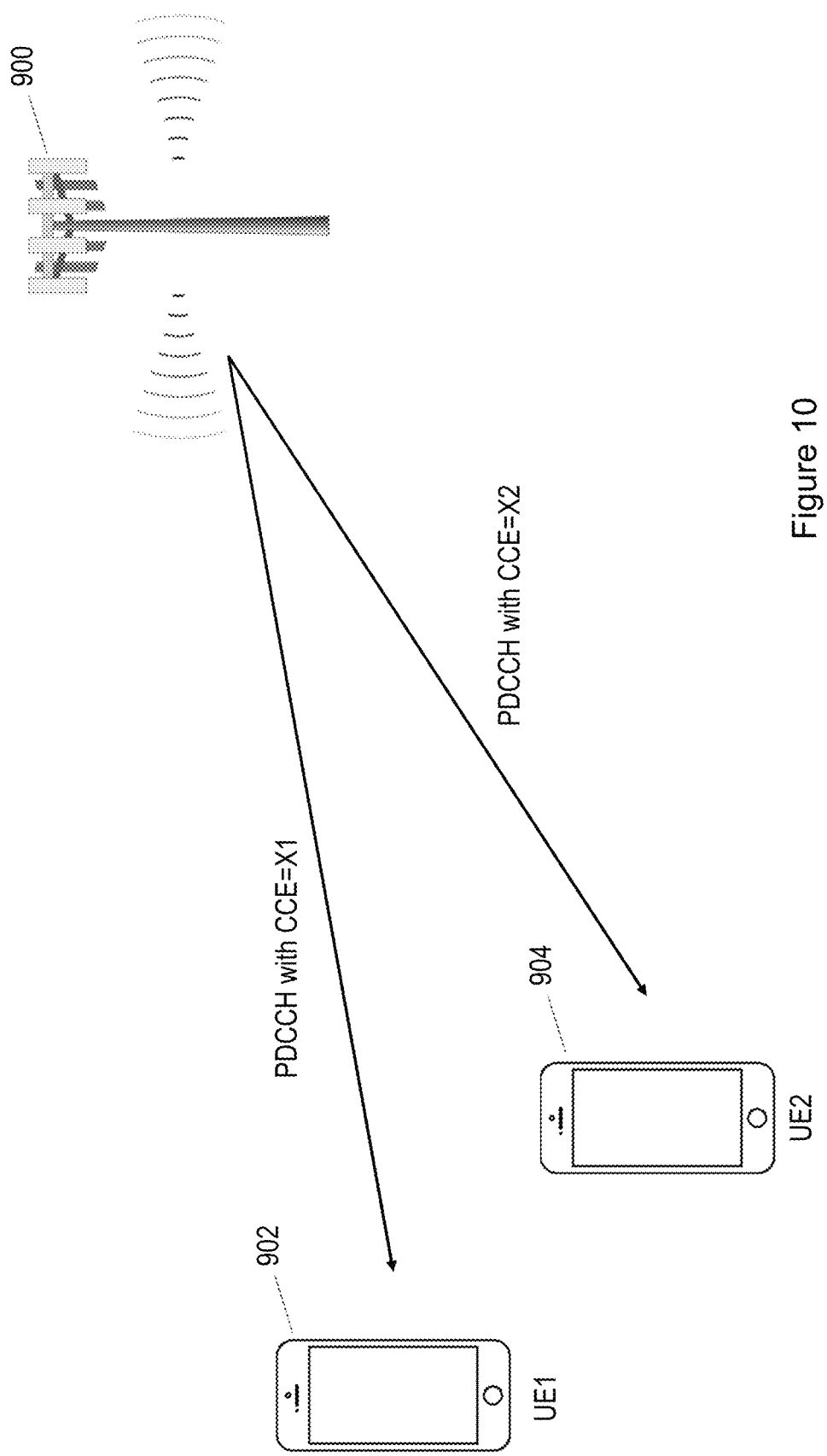
FIG. 10 is a schematic illustration of a telecommunications network according to an embodiment.

FIG. 10 illustrates an example of such a network. The network comprises a base station 900 and a plurality of UEs 902, 904. The plurality of UEs 902, 904 are within range of the base station. That is, the plurality of UEs 902, 904 are within the cell of the base station 900. In the example network illustrated in FIG. 10, a physical downlink control channel (PDCCH) carries scheduling assignments and other control information. A physical control channel is transmitted on an aggregation of one or more consecutive control channel elements (CCEs), which corresponds to (e.g. nine) resource element groups. Based on the channel condition of the UEs 902, 904, a PDCCH channel is pre-configured with an aggregation level of CCEs. Therefore, it is beneficial to be able to allocate appropriate CCEs. The technique described herein can be used to predict if a CCE is assigned incorrectly. For example, the technique described herein can be used to predict an error rate between the cell of the base station 900 and the UEs 902, 904. This can be useful as a CCE assigned incorrectly can result in a connection error between the cell of the base station 900 and the UEs 902, 904.

FIG. 11 shows an overall structure of a test dataset and a snapshot of the dataset. This test dataset has been developed to mimic a real-world physical downlink control channel (PDCCH) trace. The test dataset comprises data relating to the allocation of control channel elements (CCE). To test the performance of the proposed technique described herein, experiments have been performed on the test dataset. The test dataset comprises a reasonable number of samples such that all machine learning models can be well trained and evaluated.

Table 1 illustrates a summary of a plurality of performance measures of a traditional machine learning model (namely, a transformer model) architecture and the machine learning model (namely, a convolution transformer model or "ConvTransformer") architecture having two stages as described herein, when used on the test dataset from the PDCCH trace.

TABLE 1

Performance evaluation on PDCCH trace data.

| | Training epoch | F1 score | Precision on minor class | Recall on minor class | Area under the curve (AUC) score |
|---|---|---|---|---|---|
| Transformer | 30 | 0.81 | 0.98 | 0.63 | 0.92 |
| ConvTransformer (2-stage) | 30 | 0.86 | 0.99 | 0.70 | 0.95 |

As seen from Table 1, the convolution transformer model architecture described herein provides improved performance over the traditional transformer model architecture.

It is common for UE time sequences (and other telecommunications networks time sequences) to be extremely long. When using the traditional transformer model architecture, it is necessary to specify a maximal length for a cut-off window and this window remains the same going forward. In contrast, when using the convolution transformer model architecture described herein, there can be a (e.g. gradual) resizing of different lengths of the sequences that are analysed in successive layers at each stage according to some embodiments. This provides greater flexibility for the model to learn both global and local correlations in long sequential inputs.

Table 2 illustrates a summary of a plurality of performance measures of the machine learning model ("ConvTransformer") architecture described herein having two stages and the machine learning model ("ConvTransformer") architecture described herein having three stages, when used on a test dataset from a content delivery network (CDN). The dataset comprised a time series of data.

TABLE 2

Performance evaluation on CDN data.

| Parameter Combinations | Training epoch | F1 score | Precision on minor class | Recall on minor class | Area under the curve (AUC) score |
| --- | --- | --- | --- | --- | --- |
| ConvTransformer (2-stage) + drop 1 block + emb128 | 10 | 0.88 | 0.82 | 0.79 | 0.96 |
| ConvTransformer (3-stage) + drop 1 block + emb256 | 10 | 0.88 | 0.83 | 0.79 | 0.96 |

In Table 2, the first combination of parameters represents the two stage machine learning model architecture described herein with an embedded input dimension of 128 and the second combination of parameters represents the three stage machine learning model architecture described herein with an embedded input dimension of 256. In both situations, the first block is dropped at each stage. As can be seen from Table 2, the multiple stage machine learning model architecture described herein enables generalisation and stability in the analysis of sequential data, irrespective of the length of that sequential data (i.e. even in the case of long sequential data).

The machine learning model architecture described herein can thus be used on any type of sequence (e.g. time series) of data items. The machine learning model architecture described herein shows an advantageous advancement to processing sequential data, irrespective of whether it has a single stage or multiple stages (e.g. two, three, or more stages). In the telecommunications domain, it is often the case that an issue arises in dealing with a long sequence of data, and it often takes a great deal of time and resources to understand where relevant information may be hidden. The machine learning model architecture described herein shows the advantageous advancement to processing sequential data irrespective of the length of that sequential data and thus even in the case of long sequential data.

Figure 12:
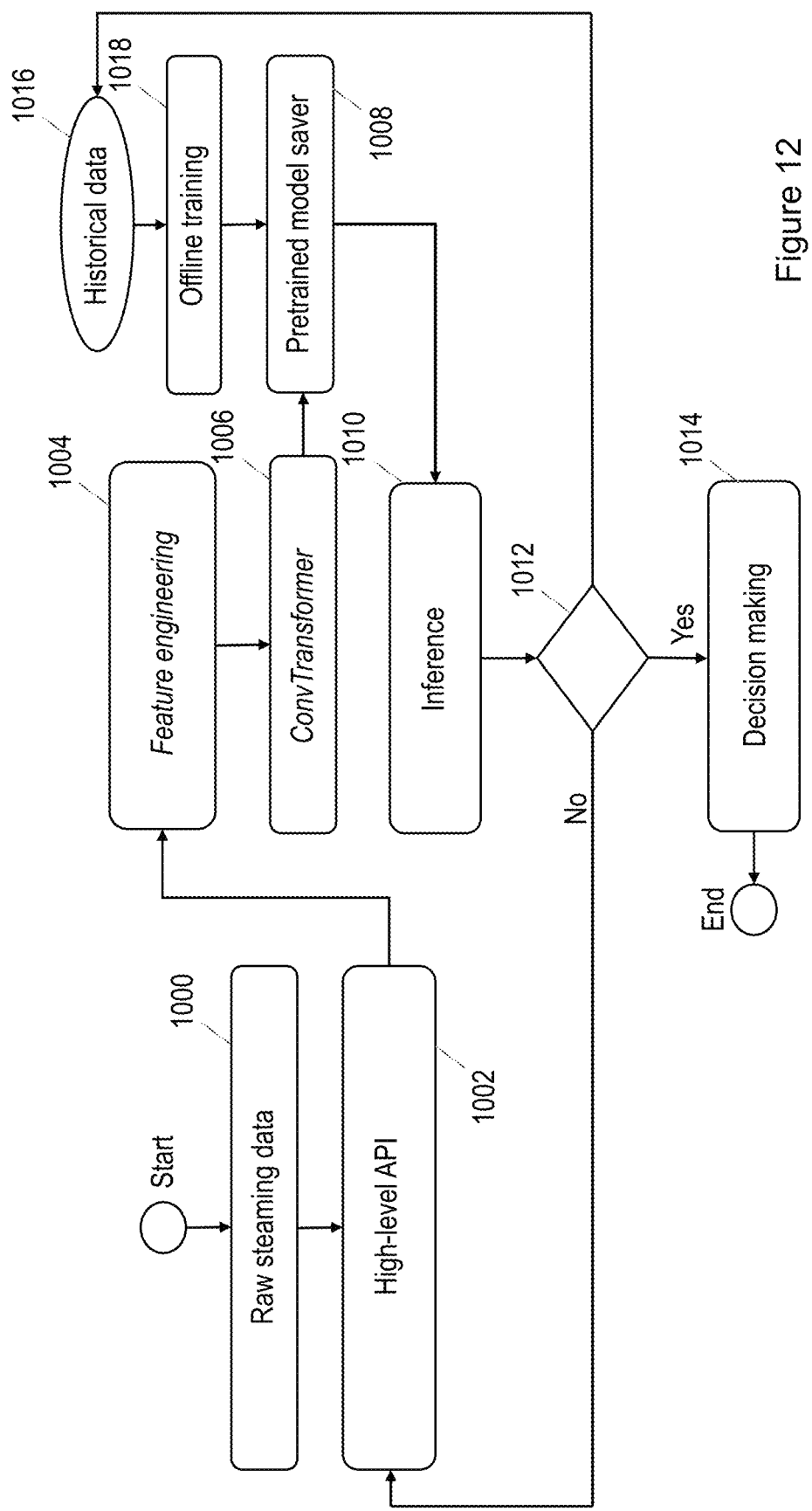
FIG. 12 is a block diagram illustrating a method performed according to an embodiment.

FIG. 12 illustrates an example method for processing a sequence of data items corresponding to one or more features of a telecommunications network according to an embodiment. At block 1000 of FIG. 12, raw data corresponding to the one or more features of the telecommunications network is streamed by one or more entities. The raw data may be ordered according to time and/or based on an identifier that identifies an entity (e.g. a UE, a user, or a cell) to which the data corresponds.

At block 1002 of FIG. 12, the raw data is received via a (e.g. high-level) API provided by a feature engineering engine. At block 1004 of FIG. 12, the feature engineering engine encodes and/or discretizes each feature of the one or more features of the telecommunications network to acquire a corresponding data item for each feature, as described earlier. Where a plurality of data items result, the resulting data items are ordered into a sequence of data items, e.g. according to time. The sequence of data items can then be input into a machine learning model (e.g. the convolution transformer model mentioned earlier).

In more detail, at block 1006 of FIG. 12, the sequence of data items is segmented into a plurality of segments and, for each segment of the plurality of segments, the data items in the segment are analysed using a machine learning model (e.g. the convolution transformer model mentioned earlier) to identify a relationship between the data items in the segment and output a representation of the data items in the segment based on the identified relationship. The representations output for the plurality of segments are combined to generate a representation of the sequence. At block 1008 of FIG. 12, the representation of the sequence is input into a pre-trained machine learning model. The pre-trained machine learning model may be stored in a memory.

At block 1010 of FIG. 12, inference is performed using the pre-trained machine learning model. Where the pre-trained machine learning model is stored in a memory, the pre-trained machine learning model can be called from the memory in order for the inference to be performed. The inference can comprise analysing the representation of the sequence using the pre-trained machine learning model to make a prediction, e.g. to predict a probability of an event occurring in the telecommunications network.

At blocks 1012 and 1014 of FIG. 12, a decision is taken based on the prediction. For example, if the prediction comprises a predicted probability, it may be checked at block 1012 of FIG. 12 whether the predicted probability is above a predefined threshold. If the predicted probability is above a predefined threshold, the process may move to block 1014 of FIG. 12 where the decision may be taken to initiate an action in the telecommunications network to prevent or minimise an impact of the event. On the other hand, if the predicted probability is not above the predefined threshold, the process may move back to block 1002 of FIG. 12.

At block 1016 of FIG. 12, the latest samples of data are pushed into a memory comprising historical data. At block 1018 of FIG. 12, the machine learning model that is used for the inference may be trained, e.g. periodically and/or offline. The training may, for example, be performed on a back-end server.

There is also provided a computer program comprising instructions which, when executed by processing circuitry (such as the processing circuitry 12 of the entity 10 described herein), cause the processing circuitry to perform at least part of the method described herein. There is provided a computer program product, embodied on a non-transitory machine-readable medium, comprising instructions which are executable by processing circuitry (such as the processing circuitry 12 of the entity 10 described herein) to cause the processing circuitry to perform at least part of the method described herein. There is provided a computer program product comprising a carrier containing instructions for causing processing circuitry (such as the processing circuitry 12 of the entity 10 described herein) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the entity functionality described herein can be performed by hardware. Thus, in some embodiments, the entity 10 described herein can be a hardware entity. However, it will also be understood that optionally at least part or all of the entity functionality described herein can be virtualized. For example, the functions performed by the entity 10 described herein can be implemented in software running on generic hardware that is configured to orchestrate the entity functionality. Thus, in some embodiments, the entity 10 described herein can be a virtual entity. In some embodiments, at least part or all of the entity functionality described herein may be performed in a network enabled cloud. Thus, the method described herein can be realised as a cloud implementation according to some embodiments. The entity functionality described herein may all be at the same location or at least some of the functionality may be distributed, e.g. the entity functionality may be performed by one or more different entities.

It will be understood that at least some or all of the method steps described herein can be automated in some embodiments. That is, in some embodiments, at least some or all of the method steps described herein can be performed automatically. The method described herein can be a computer-implemented method.

Therefore, as described herein, there is provided an advantageous technique for processing a sequence of data items corresponding to one or more features of a telecommunications network. The technique described herein is suitable for any length sequence of data items, and even a long sequence of data items. In the manner described herein, valuable local information (from smaller segments) can be captured. In some embodiments, it is possible for both local information (from smaller segments) and global information (from larger segments) to be preserved at the same time. As the technique described herein can capture local information in a sequence of data items, the technique described herein can outperform existing techniques, such as recurrent neural network (RNN) techniques. The technique described herein is more accurate and more efficient than the existing techniques.

The technique described herein is thus beneficial in a variety of use cases, such as any use cases that involve the analysis of a sequence (e.g. time series) of data items. For example, failure and/or error prediction in a telecommunications network can be dependent, not only on the entire sequence of data items, but also on local information within some segments (or regions) from the sequence. Thus, the technique described herein can be beneficial in failure and/or error prediction.

A more specific use case in respect of which the technique described herein can be beneficial is in an error rate assessment from a physical downlink control channel (PDCCH), which plays a role in the communication between cells of base stations and UEs. In this scenario, a UE can generate long historical time series data. If a regular RNN or transformer is applied to such a sequence of data, with a maximal cut-off, it is computationally expensive and difficult to decide on an appropriate size for the cut-off window. This computational expense and difficulty can be avoided by using the technique described herein, such as by capturing both global information and local hidden information with training and inference efficiency.

Although some example use cases have been described herein, it will be understood that the technique described herein can be broadly applied to many other use cases and it will be understood that it is not limited to the examples described herein.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer-implemented method for processing a sequence of data items, wherein the data items correspond to one or more features of a telecommunications network, the method comprising:
    segmenting the sequence of data items into a plurality of segments;
    for each segment of the plurality of segments, analyzing the data items in the segment using a machine learning model to identify a relationship between the data items in the segment and output a representation of the data items in the segment based on the identified relationship;
    combining the representations output for the plurality of segments to generate a representation of the sequence; and
    repeating, for at least an initial iteration, the segmenting, the analyzing, and the combining to generate a different representation of the sequence for each iteration,
    wherein the representation of the sequence generated from one iteration is the sequence that is segmented in the subsequent iteration.

2. The method as claimed in claim 1, wherein:
    each segment of the plurality of segments comprises the same number of data items as each other segment of the plurality of segments.

3. The method as claimed in claim 1, wherein:
    the number of representations of data items in the generated representation of the sequence corresponds to the number of data items in the sequence.

4. The method as claimed in claim 1, wherein:
    the representations of data items in the representation of the sequence are in a corresponding order to an order of the data items in the sequence.

5. The method as claimed in claim 1, wherein:
in the initial iteration, the representation of the sequence is segmented differently from the sequence; and
in at least one subsequent iteration, the representation of the sequence is segmented differently from the representation of the sequence in any one or more preceding iterations.

6. The method as claimed in claim 1, wherein:
in the initial iteration, the plurality of segments into which the representation of the sequence is segmented each comprise representations of a different number of data items than the number of data items in each of the plurality of segments into which the sequence is segmented; and
in the at least one subsequent iteration, the plurality of segments into which the representation of the sequence is segmented each comprise representations of a different number of data items than the number of data items in each of the plurality of segments into which the representation of the sequence is segmented in any one or more preceding iterations.

7. The method as claimed in claim 6, wherein:
the different number of data items is a larger number of data items.

8. The method as claimed in claim 1, wherein:
the number of representations of data items in the generated representation of the sequence for each iteration corresponds to the number of data items in the sequence.

9. The method as claimed in claim 1, wherein:
the sequence of data items is ordered according to time.

10. The method as claimed in claim 1, wherein:
the sequence of data items is in the form of a vector.

11. The method as claimed in claim 1, wherein:
each feature of the one or more features is encoded or discretized to acquire the corresponding data item.

12. The method as claimed in claim 11, wherein:
each feature of the one or more features that is a numerical feature is discretized to acquire the corresponding data item; and
each feature of the one or more features that is a categorical feature is encoded to acquire the corresponding data item.

13. The method as claimed in claim 1, wherein:
the machine learning model is a machine learning model that is suitable for natural language processing.

14. The method as claimed in claim 1, wherein:
the one or more features of the telecommunications network comprise one or more features of at least one network node of the telecommunications network.

15. The method as claimed in claim 1, wherein:
the data items correspond to a user equipment served by the telecommunications network; and
an identifier that identifies the user equipment is assigned to the at least one sequence of data items.

16. The method as claimed in claim 1, wherein:
the data items comprise information indicative of a quality of a connection between a user equipment and at least one network node of the telecommunications network.

17. The method as claimed in claim 1, the method comprising:
analyzing the representation of the sequence using a pre-trained machine learning model to predict a probability of an event occurring in the telecommunications network.

18. The method as claimed in claim 17, the method comprising:
if the predicted probability is above a predefined threshold, initiating an action in the telecommunications network to prevent or minimize an impact of the event.

19. An entity comprising:
processing circuitry; and
at least one memory for storing instructions which, when executed by the processing circuitry, cause the entity to operate in accordance with claim 1.

20. A computer-implemented method for processing a sequence of data items, wherein the data items correspond to one or more features of a telecommunications network, the method comprising:
segmenting the sequence of data items into a plurality of segments;
for each segment of the plurality of segments, analyzing the data items in the segment using a machine learning model to identify a relationship between the data items in the segment and output a representation of the data items in the segment based on the identified relationship; and
combining the representations output for the plurality of segments to generate a representation of the sequence, wherein the number of representations of data items in the generated representation of the sequence corresponds to the number of data items in the sequence.

21. A computer-implemented method for processing a sequence of data items, wherein the data items correspond to one or more features of a telecommunications network, the method comprising:
segmenting the sequence of data items into a plurality of segments; and
for each segment of the plurality of segments, analyzing the data items in the segment using a machine learning model to identify a relationship between the data items in the segment and output a representation of the data items in the segment based on the identified relationship, wherein:
the data items correspond to a user equipment served by the telecommunications network; and
an identifier that identifies the user equipment is assigned to the at least one sequence of data items.

* * * * *